US007079862B2

United States Patent
Chien (10) Patent No.: US 7,079,862 B2
(45) Date of Patent: Jul. 18, 2006

(54) RE-POSITIONING REMINDER FOR CELLULAR PHONE

(75) Inventor: Highly Chien, Taipei (TW)

(73) Assignee: Special Telecommunications Co., Ltd., Taipei (TW)

(*) Notice: Subject to any disclaimer, the term of this patent is extended or adjusted under 35 U.S.C. 154(b) by 157 days.

(21) Appl. No.: 10/735,612

(22) Filed: Dec. 16, 2003

(65) Prior Publication Data

US 2005/0020300 A1    Jan. 27, 2005

(30) Foreign Application Priority Data

Jul. 25, 2003    (CN) .............................. 092213589 U (51) Int. Cl.
*H04Q 7/20*    (2006.01)

(52) U.S. Cl. .................... 455/553.1; 455/403

(58) Field of Classification Search ................ 455/401, 455/343.3, 344, 348, 553.1, 403; 379/207.1–10
See application file for complete search history.

(56) References Cited

U.S. PATENT DOCUMENTS

| 4,481,382 | A | * | 11/1984 | Villa-Real | ................. | 455/556.1 |
| 4,922,529 | A | * | 5/1990 | Kiel | ............................. | 379/377 |
| 5,317,626 | A | * | 5/1994 | Jaynes et al. | .............. | 379/67.1 |
| 5,987,119 | A | * | 11/1999 | Lee | ............................. | 379/379 |
| 6,262,657 | B1 | * | 7/2001 | Okuda et al. | ................ | 340/439 |
| 6,674,358 | B1 | * | 1/2004 | Tinsley | ........................ | 340/7.63 |
| 6,850,601 | B1 | * | 2/2005 | Jones et al. | .................... | 379/45 |

* cited by examiner

*Primary Examiner*—CongVan Tran
(74) *Attorney, Agent, or Firm*—Troxell Law Office, PLLC (57) ABSTRACT

A switch operated re-positioning reminder for a cellular phone is equipped with a time counter which can actuate an alarm device after a preset time is counted down. The magnet operated reed-in-tube switch is made up of a pair of partially overlapped but separated reeds in a tube, or other types of switch. The time counter is a simple CPU contained program and a user can set up the prolonged time span as desired for the time counter. The alarm is a buzz, ring or speaker that can produce alarm sound. In a first embodiment, a PC board including the magnet operated reed-in-tube switch, the CPU, the buzzer and a battery can be housed in a rather thin shelter case wherein a magnet is attached to a cellular phone or other precious articles and the shelter box is fixed to the interior of a cellular phone case. In other embodiment, the magnet is fixed to a proper position of a cellular phone case, and the time counter program is merged with a conventional cellular phone circuit and the original ring system for the cellular phone is adopted as an alarm whereby as long as a cellular phone in either case is not repositioned in a cellular phone case in a preset time, the alarm device in either the shelter box or the cellular phone will be actuated to alarm so as to remind a user not to leave his or her cellular phone behind.

20 Claims, 12 Drawing Sheets

RE-POSITIONING REMINDER FOR CELLULAR PHONE

BACKGROUND OF THE INVENTION

A switch operated re-positioning reminder for a cellular phone is equipped with a time counter which can actuate an alarm device when a preset time is counted down. A magnet operated reed-in-tube switch is made up of a pair of partially overlapped but separated reeds in a tube, or other types of switches are used in the present invention. The time counter is a simple CPU contained program and a user can set up the prolonged time span as desired for the time counter. The alarm is a buzz, ring or speaker that can produce alarm sound. In the first embodiment, a PC board including the magnet operated reed-in-tube switch, the CPU, the buzz and a battery can be housed in a rather thin shelter case wherein a magnet is attached to a cellular phone or other expensive articles and the shelter case is fixed to the interior of a cellular phone case. In another embodiment, the magnet is fixed to a proper position of a cellular phone case, and the time counter program is merged with a conventional cellular phone circuit and the original ring system for the cellular phone is adopted as an alarm whereby as long as a cellular phone in either case is not repositioned in a cellular phone case in a pre-set time, the alarm device fixed in either the shelter case or the cellular phone will be actuated to alarm to remind a user not to leave his or her cellular phone behind.

Cellular phones have been regarded as the most important and influential personal communication equipment ever developed in the history of mankind. Men living in modern societies all over the world have enjoyed the convenience brought by the cellular phones in daily life but they are always worried about loss of the cellular phones and other people might take advantage of their lost cellular phones and make illegal phone calls in one aspect and are afraid that some other people might even make use such illegally obtained cellular phones to conduct criminal acts, causing annoying and unnecessary troubles for them in another aspect.

Trying to solve such kind a problem, many prior art techniques have been developed and applied to such precious cellular phones, note books or golf bags to remind those absent-minded people not to leave their personal objects behind when they left a place. At present, the most popular reminder devices make use of a major and minor unit that are separately mounted to a person and to a personal article. As long as the major and minor units are separated away from each other at such a distance that the signals generated by one of the units can not be received by the other, an alarm sound will be produced. There are many disadvantages in such wireless electronic reminder devices to be overcome; for example, the bulky size of the device can not be minimized, the cost of production is relatively too high and the frequency interference can sometimes cause false operations or non-operations. The most problematic technique to be overcome is the power consumption; in real practice, a battery can only sustain several weeks in such wireless electronic reminder devices. It is not environment friendly and economic at all in practical use.

In use of the device of the present invention, for a male user, a thin magnet plate is attached to the back of a cellular phone and the other electronic parts are housed in a case that is fixed inside a cellular phone pocket. As the cellular phone is put into the cellular phone pocket, the magnet plate on the phone will make the magnet operated reed-in-tube switch electrically connected and the electronic parts will not be actuated to work. When the cellular phone is taken out of the pocket, the magnetic force will disappear from the pocket, causing the reed-in-tube switch to be disconnected. Accordingly, the CPU of the reminder will be actuated to count down. In general, a phone call can be generally done in average in 3 minutes, so the CPU is set to function in 3 minutes. When the preset time is completely counted down, a reminding alarm is generated to remind a person to put the cellular phone back into the phone pocket to terminate the alarm sound. Thereby the cellular phone will not be placed randomly but only in the phone pocket to prevent the same from being lost.

SUMMARY OF THE INVENTION

Therefore, the primary object of the present invention is to provide a low cost and simply structured repositioning reminder which can be mounted onto any precious personal articles so that when an article is not put back to its original position in a preset time, a buzzer or speaker will be actuated to send off alarm sound, reminding a person not to leave his or her personal article behind.

Another object of the present invention is to provide a re-positioning reminder whose main electric circuit can be alternatively set in the interior of a cellular phone with a strong magnet plate secured to the interior of a cellular phone pocket or case whereby once a precious article, such as a cellular phone, is separated from a cellular phone pocket and is set in a stand-by mode with the time in excess of a preset time, the CPU of the cellular phone will directly start its original vibration alarm circuit to remind a person not to leave the cellular phone behind.

One further object of the present invention is to provide a re-positioning reminder wherein the delayed time of the counting program of the time counter can be adjusted by the CPU of the electric circuit according to the required operational conditions.

DETAILED DESCRIPTION OF THE PREFERRED EMBODIMENTS

Figure 1:
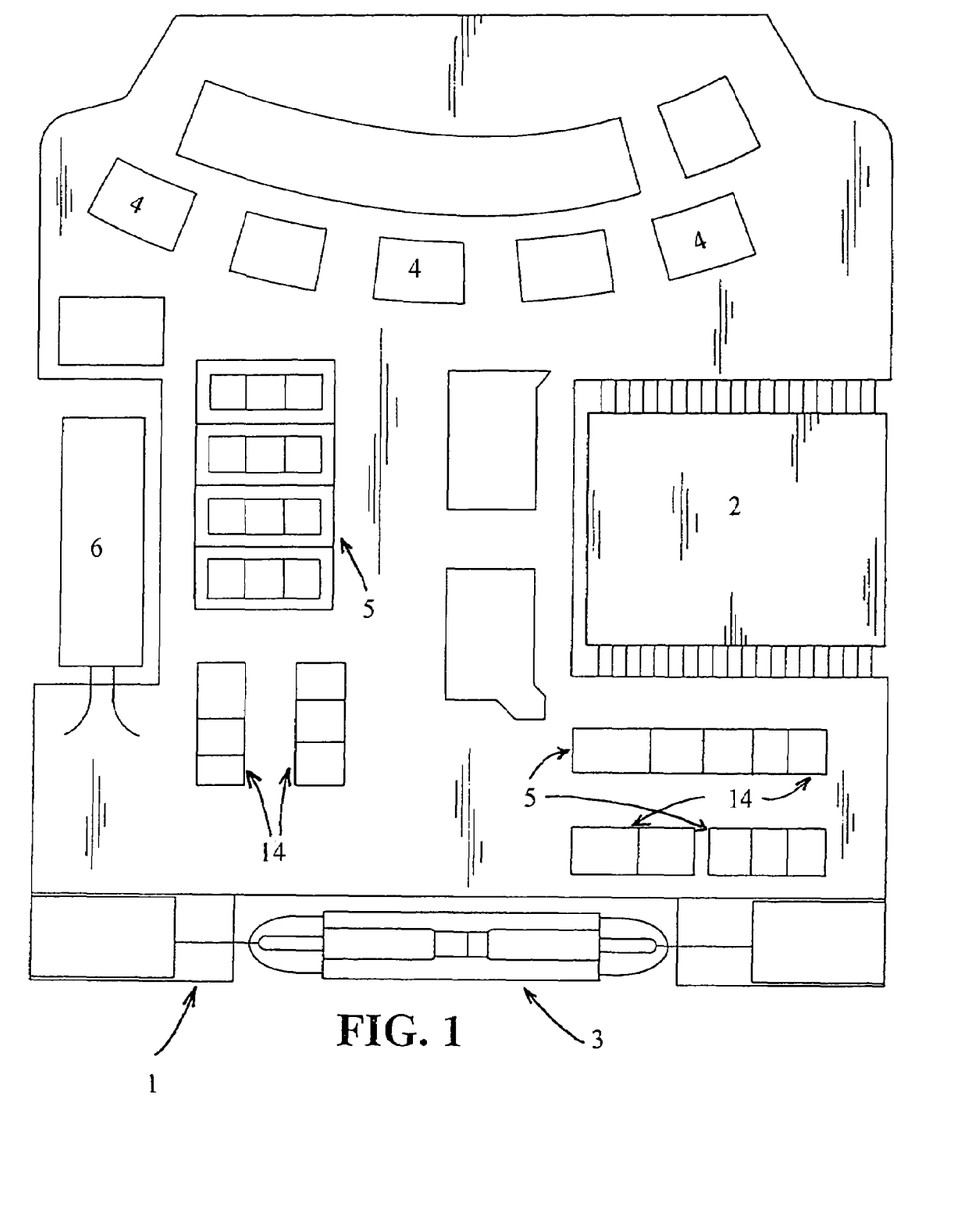
FIG. 1 is a diagram showing the exploded components of the main circuit.

Referring to FIG. 1, the electronic device of the present invention is mainly to mount on a PC board 1 electrical components including a super power-saving, low voltage operated single chip CPU 2, which is equipped with a repositioning reminder program provided with a sleeping mode so as to make electrical power of the battery consumed in a more effective manner. Thus, the battery can last more than one year with each replacement. Moreover, on the PC board 1 are disposed a magnet-operated reed-in-tube switch 3 and a plurality of copper contact plates 4 and a plurality of resistors 5, capacitors 14 and a fundamental oscillator 6. As further shown in FIGS. 2, 3, 4 and 5, the PC board 1 is placed at the center of a plastic front lid 11 of a shelter case 10. The bottom section of the plastic front lid 11 is provided with a resonance chamber 7 for the housing of a buzzer 8. The amplified sound from the resonance chamber 7 is sent out from an outlet hole 9. The upper section of the front lid 11 is provided with a lithium battery 15 whose positive terminal can be coupled to one of the copper contact plates 4 via a pivotal copper selection plate 13 on the PC board 1 for serving as a stage type selection switch, including 5 operation states, i.e., OFF, delay of 30 seconds, 1 minute, 3 minutes and 5 minutes respectively.

The rear cover 12 is made of aluminum alloy with its thickness only 0.3 mm so as to minimize the total thickness of the case. It can serve as the negative pole of the battery and also shield electromagnetic waves, preventing the CPU from out of function due to the abnormal influence of the electromagnetic waves.

Figure 2:
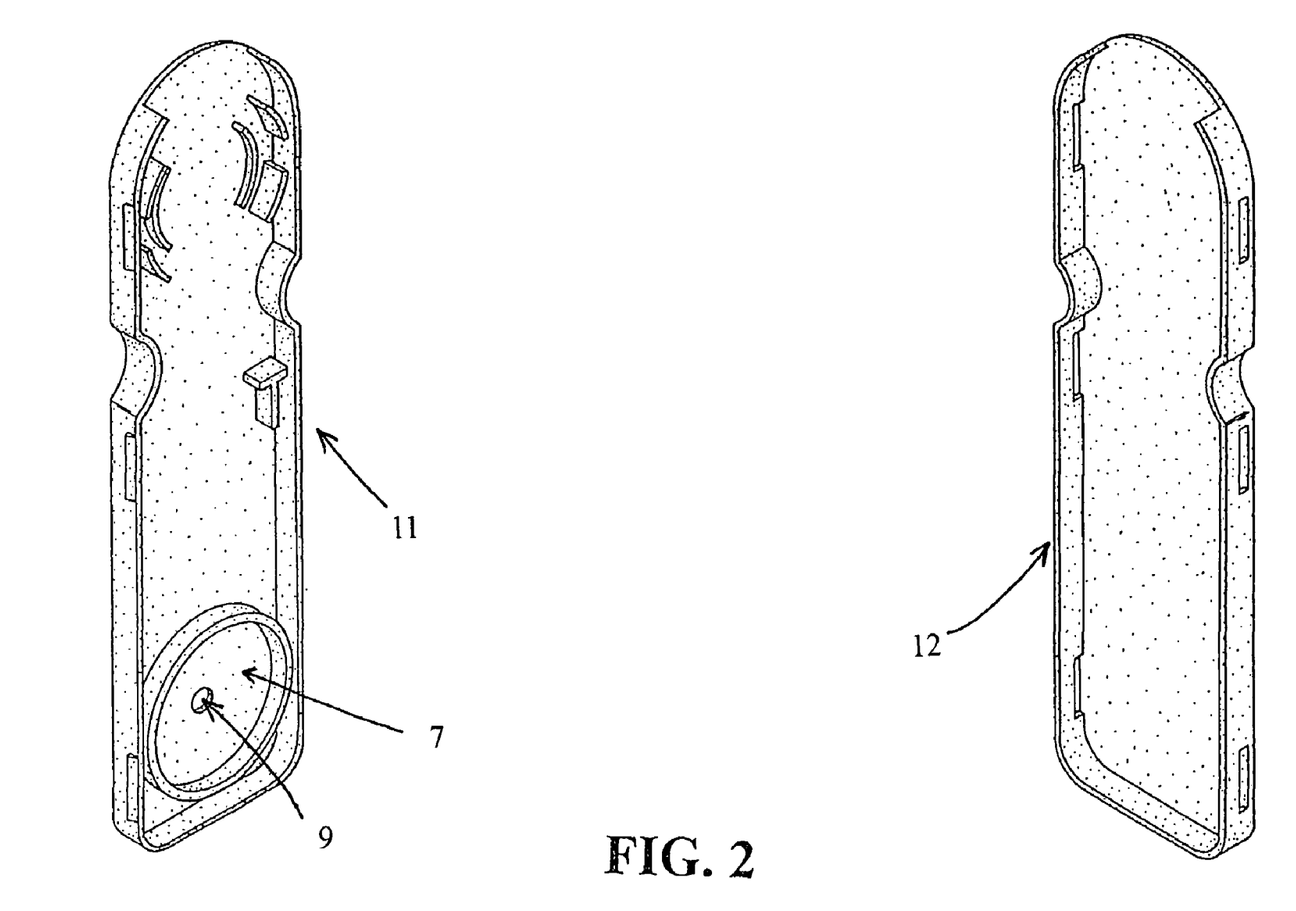
FIG. 2 is a diagram showing the front and rear shelter of the case.
Figure 3:
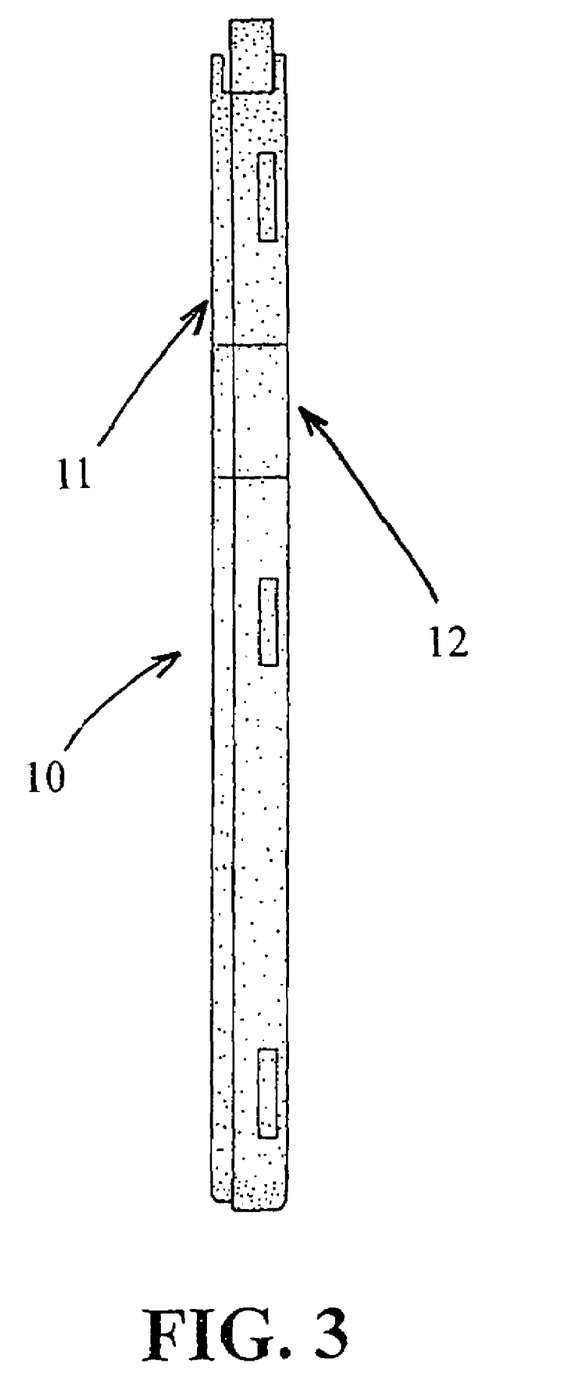
FIG. 3 is a side view of an assembled case.
Figure 4:
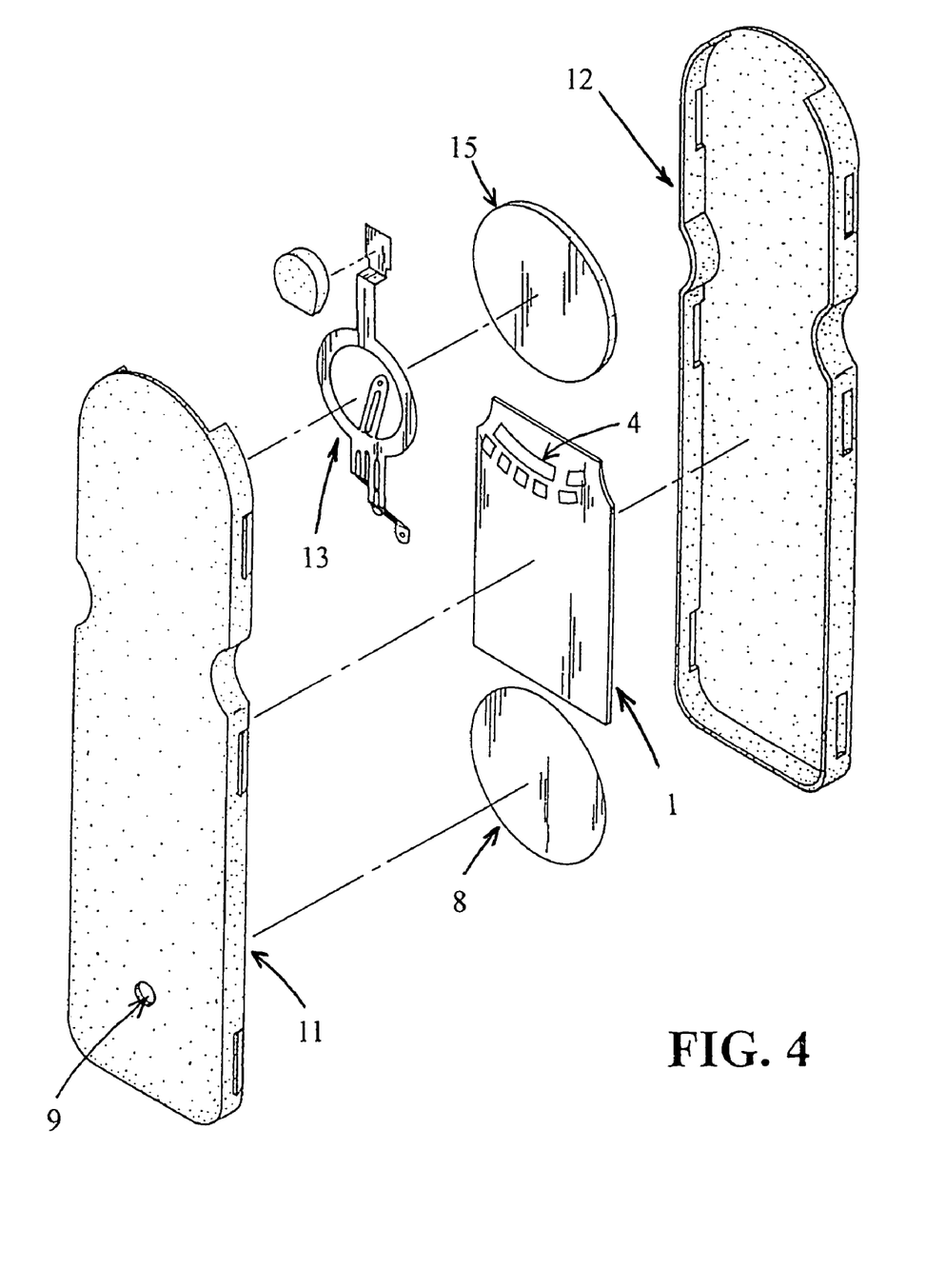
FIG. 4 is a perspective diagram showing the exploded components of the first embodiment of the present invention with the electronic components housed in the case.
Figure 5:
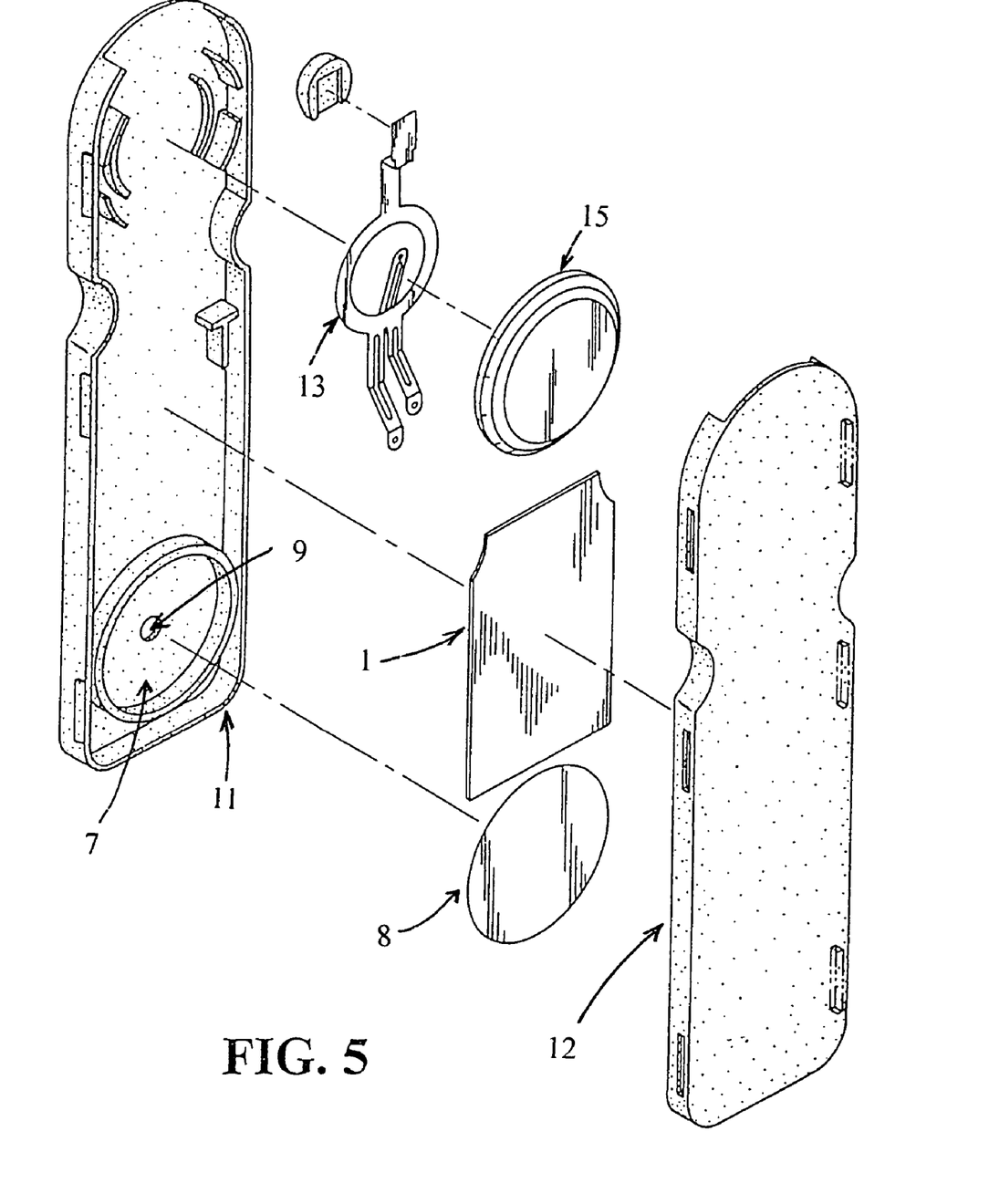
FIG. 5 is a perspective diagram showing the same exploded components view from other direction.

As shown in FIG. 2 and FIG. 3, the assembly of the whole unit measures 7 cm in length, 2.5 cm in width and 0.3 cm in thickness. It is so small in size that it can be housed with the cellular phone 50 together in a general cellular phone pocket 60 as shown in FIG. 6 without making any variation of the equipment.

Figure 6:
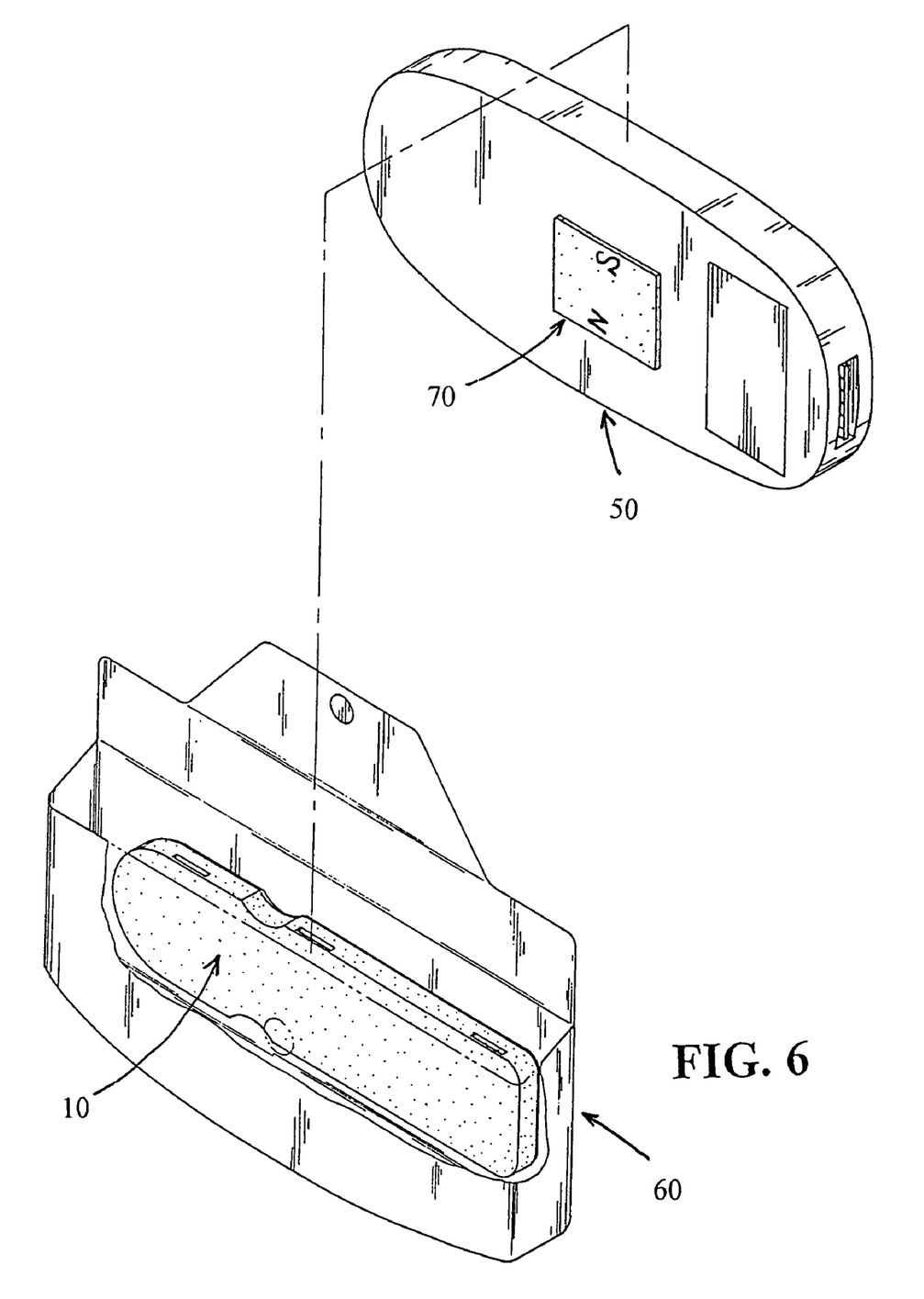
FIG. 6 is a diagram showing a cellular phone with a magnet plate attached to the back thereof and the case of the first embodiment fixed to the inner surface of a cellular phone pocket.

In the first embodiment, to the back of the cellular phone 50 is attached a magnet plate 70 and inside the cellular phone pocket 60 is fixed the case 10 in which all the above cited components are installed to make it functionally operable, as illustrated in FIG. 6. In practical use, when the cellular phone is 50 is put inside the cellular phone pocket 60, the magnet operated reed-in-tube switch in the repositioning reminder device will be activated by the magnet plate to connected and disconnected of its reed to get the reminder device turned on or off.

In a second embodiment of the present invention, the re-positioning reminder device is arranged in a wholly reverse manner but it works in a more effective way than the first embodiment.

In the second embodiment, almost no extra investment is required to make the production possible. In a newly designed or developed cellular phone 50, a time counter program is directly written or recorded into the CPU of the original cellular phone, and the power is supplied from the battery of the cellular phone 50. The alarm device adopts the vibration type alarm ring of the original cellular phone 50. The stepwise selection switch can be adapted to use the buttons of the keyboard and the only part to be mounted onto the cellular phone is the magnet actuated reed-in-tube switch.

Figure 7:
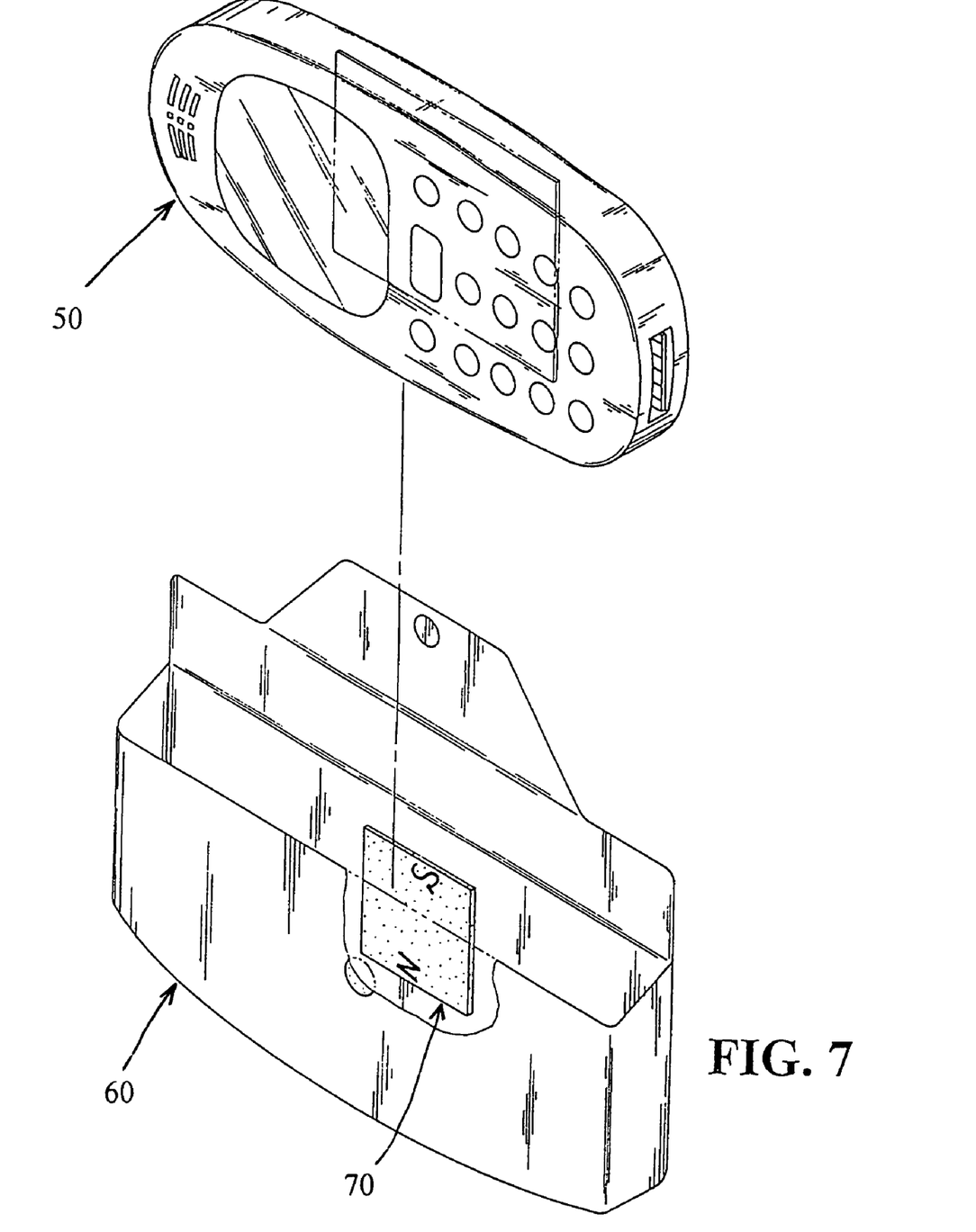
FIG. 7 is a diagram showing a second embodiment of the present invention wherein the cellular phone pocket is equipped with a magnet plate on the inner surface and the circuit of the present invention directly implanted in the cellular phone circuit board.
Figure 12:
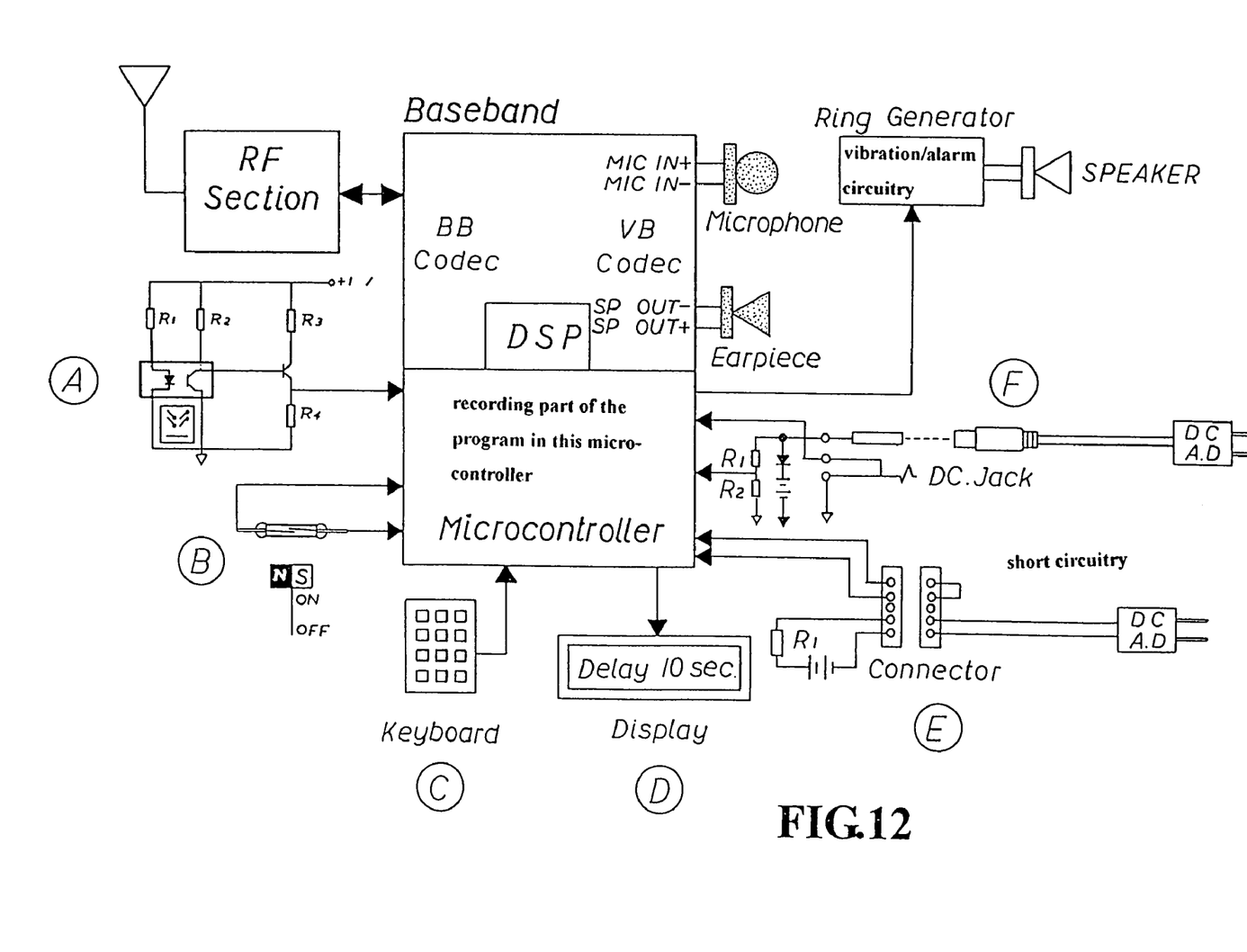
FIG. 12 is a diagram showing a circuit of the second embodiment wherein all the operation signals entering the CPU of the cellular phone are illustrated and indicated by A, B, C, D, E and F; as long as any one of the signals is input into the CPU, the repositioning reminder circuit of the cellular phone will be turned off not to produce alarm sound.

Referring first to FIG. 7 and FIG. 12, the thin magnet plate 70 attached to the back of the cellular phone 50 in the first embodiment is now secured to a proper position in the interior of the cellular phone pocket 60 for a change. As the cellular phone 50 is placed inside the cellular phone pocket 60, the magnet actuated reed-in-tube switch in the cellular phone 50 is activated to turn on subject to the magnetic force of the magnet plate 70, the re-positioning reminder program is not in operation.

Once the cellular phone is taken out of the phone pocket 60, the magnet actuated reed-in-tube switch breaks apart to get the re-positioning reminder program functioning with a period of 10 seconds set up to get the cellular phone alarming if no dialing operation or function setting act is detected. So, a person can make use of the 10 seconds to start dialing a cellular phone or setting up functions on the cellular phone. Once the cellular phone 50 is in use, the program will stop time counting operation. After a phone call is terminated and the phone is in a standby mode, the re-positioning reminder program starts the time counting again. After 10 seconds, the alarm will be actuated if the cellular phone 50 is not put back to the phone pocket 60 in which the magnet plate inside the phone pocket 60 will stop the function of the re-positioning reminder program by way of its magnetic force to actuate the reed-in-tube switch. In such a manner, a cellular phone 50 will never be forgot or left behind after use.

Figure 11:
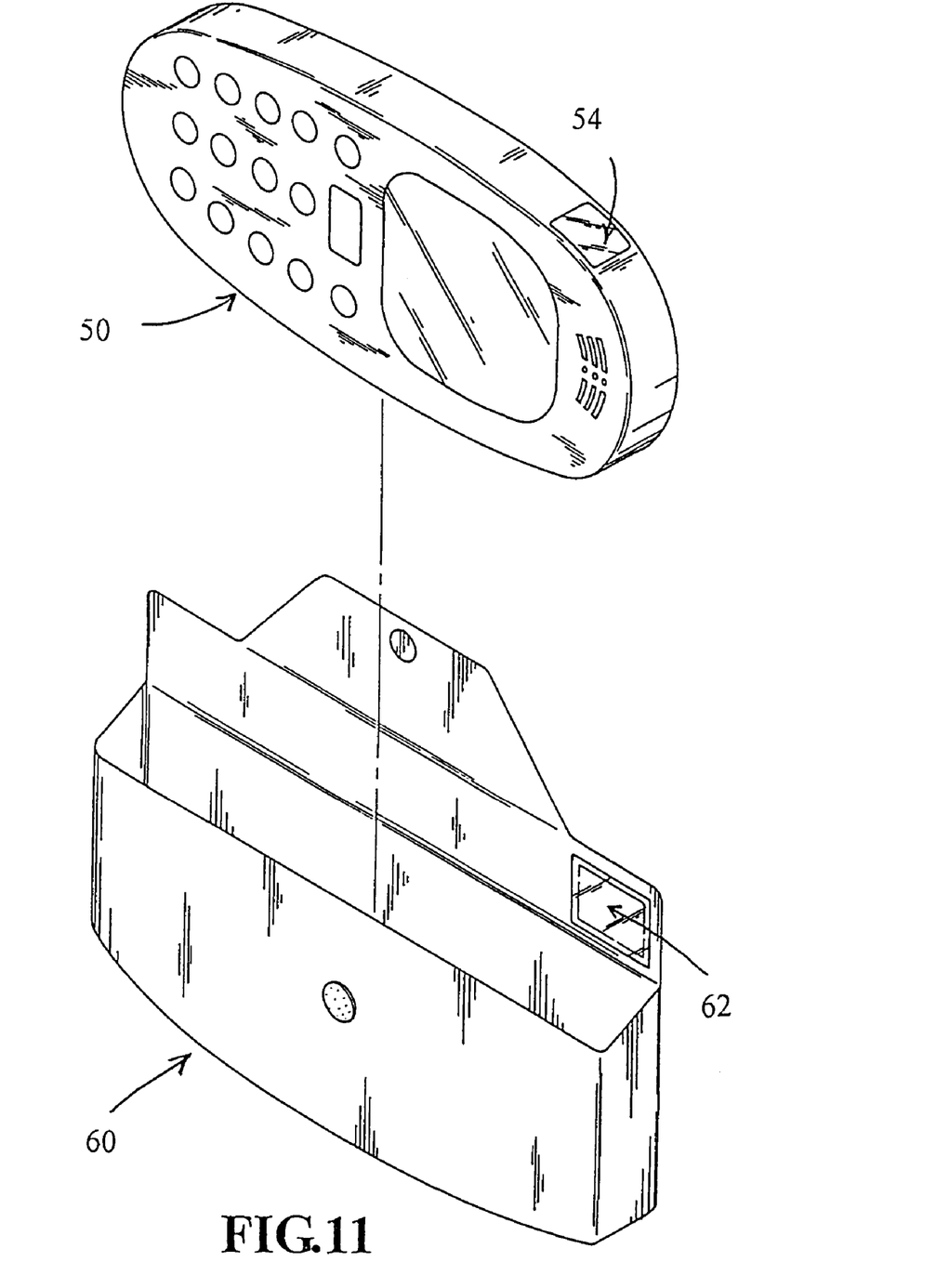
FIG. 11 is a diagram showing the infrared transmission window of a cellular phone in the second embodiment is used to send a weak infrared signal in its stand-by status; as a piece of white paper is placed adjacent the window, the infrared will be reflected back to prevent the alarm unit of the repositioning reminder device of the cellular phone from working.

Moreover, as shown in FIG. 11 and the part A of FIG. 12, the magnet actuated reed-in-tube switch cab be alternatively replaced by an infrared operated circuit switch 54 which can be planted inside the circuit board of a cellular phone. In this instance, a reflective device 62, such as a piece of white paper, placed inside the phone pocket 60 and positioned in alignment with the emitter of the infrared operated circuit switch 54 is employed to reflect the infrared signals back to a receiver of the infrared operated circuit switch 54. Thus, as the cellular phone 50 is put back into the phone pocket 60, the infrared signals issued by the infrared operated circuit switch 54 can be bounced back by the white reflective device 62, such as a piece of white paper. The reflected infrared signals can be used to automatically shut off the re-positioning reminder program inside of the cellular phone 50.

In order to advance the facility of use of the present invention in daily life, the inventor has made an analysis on all the causes of a cellular phone being taken out of a phone pocket in daily operations. Some people are used to nest their cellular phones in a phone cradle or seat. So, as a magnet plate 70 is placed at a proper position of the phone cradle or seat (not shown), the re-positioning reminder program of the cellular phone 50 can be shut off by the magnetic force when the cellular phone is put on such a cradle or seat. Furthermore, a magnet plate 70 can be also secured to a receiving box on a vehicle or on the table at your house so that the cellular phone 50 can be placed thereat to get the re-positioning reminder program of the cellular phone 50 turned off, as illustrated in the part B of FIG. 12.

Figure 8:
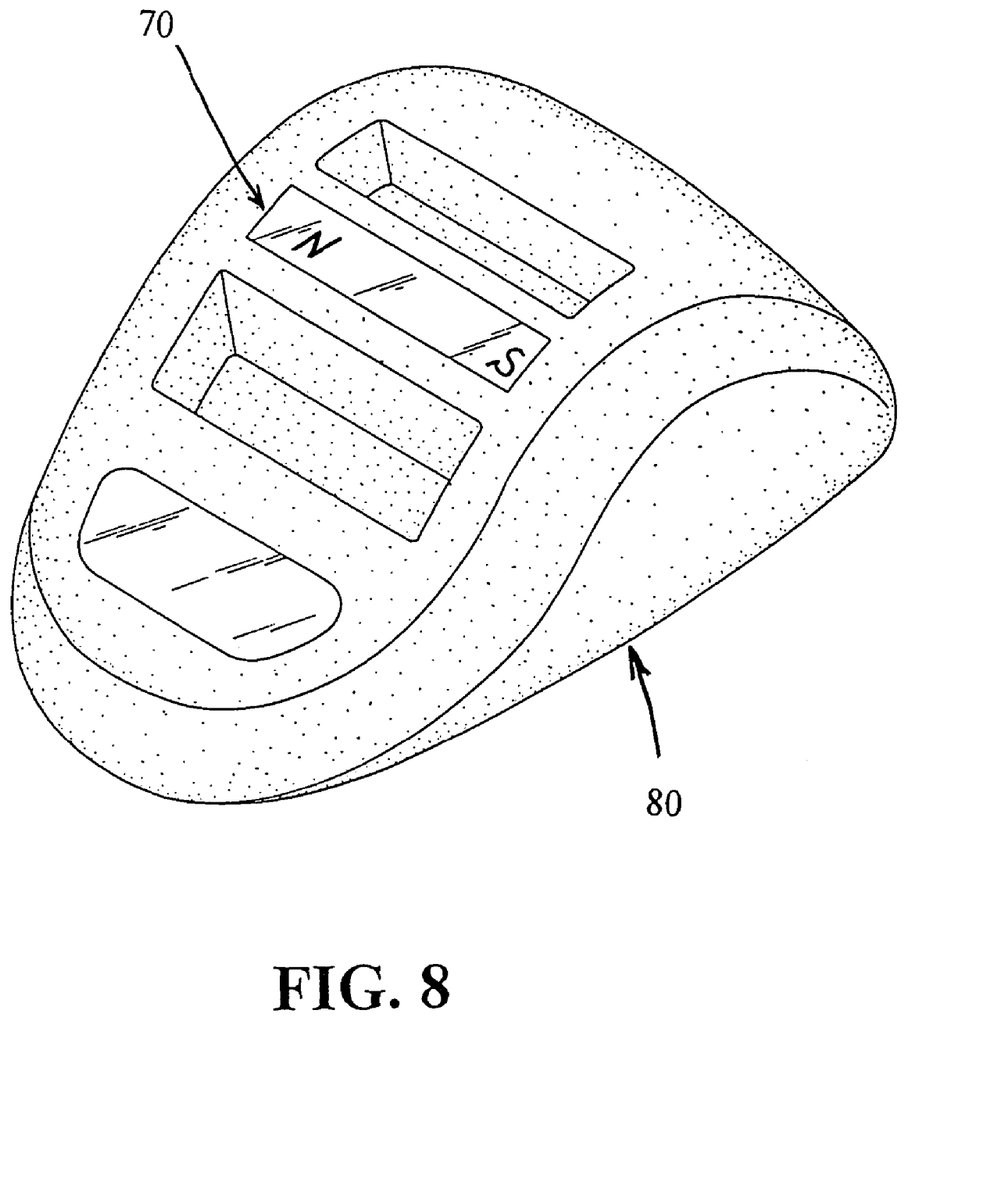
FIG. 8 is a diagram showing a common charger mount with a magnet plate fixed at proper position on the charger.

Furthermore, as shown in FIG. 8, a magnet plate 70 can also be secured to such a proper position of a charger mount 80 that as the cellular phone 50 is put in the charger mount 80, the re-positioning reminder program will be shut off by the magnetic force as described in the previous examples.

Referring to the sections C and D of FIG. 12, as the buttons of the cellular phone 50 are being operated or the phone is in use, the alarm of the re-positioning reminder is not in function.

Figure 9:
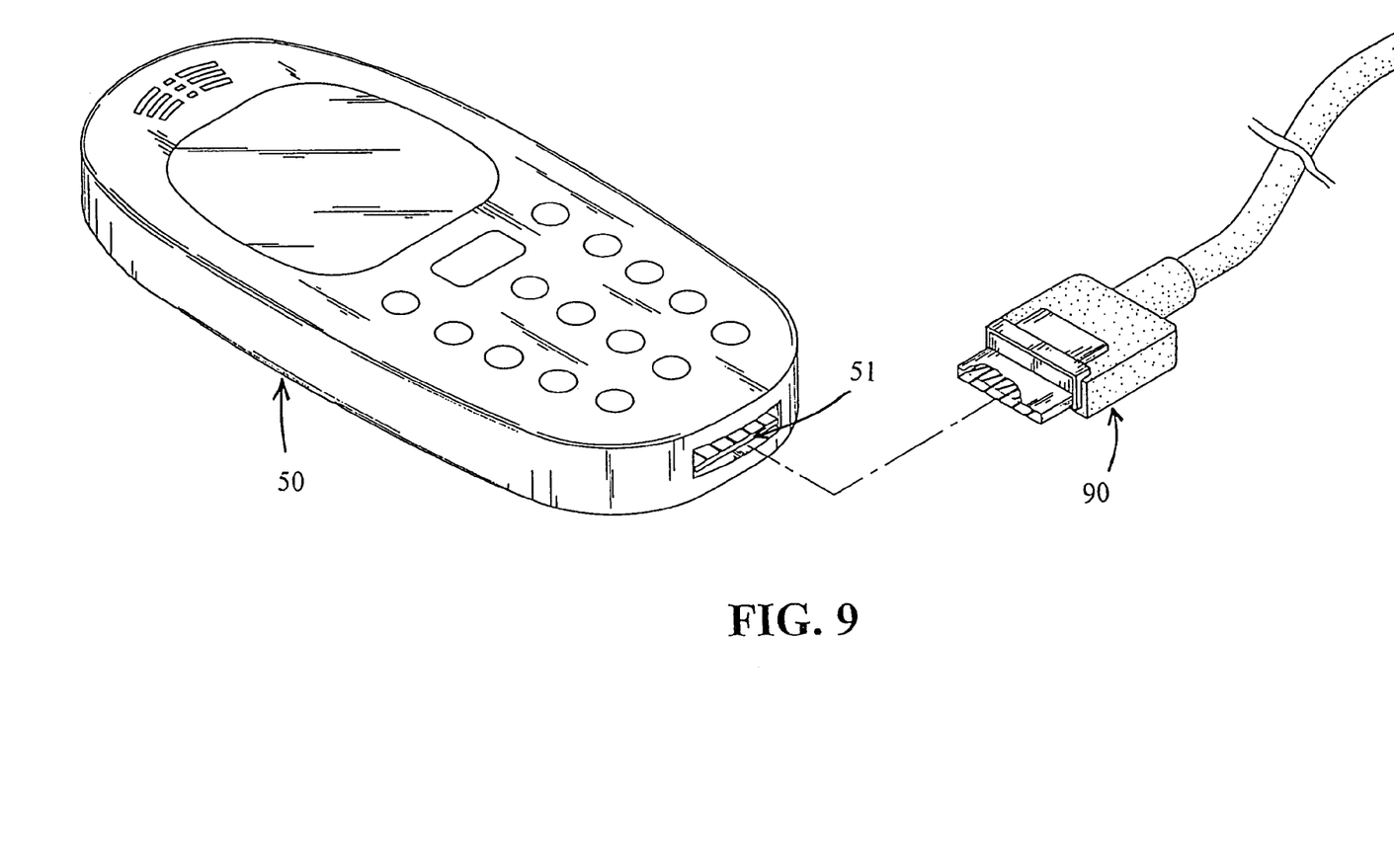
FIG. 9 is a diagram showing the second embodiment of the present invention wherein the cellular phone is charged by a travel charging means having a socket-pin type plug in which a pair of pins are short circuited and as the multiple pinned plug is engaged in a socket of the cellular phone, the corresponding connection points of the socket will also be short circuited so as to make the cellular phone will not produce alarm sound to remind the user.

Referring to FIG. 9 and the section E of FIG. 12, if a traveler's cable type charger makes use of a socket-pin type plug 90 which is in connection to the socket 51 of the cellular phone 50, there is a set of pins put in a short circuitry on the plug 90. Once the plug 90 is registered with the socket 51 of the cellular phone 50, the short circuited pins on the plug 90 will render a corresponding set of pins in short circuitry. Such a short circuitry signal will make the alarm system of the cellular phone 50 stop functioning accordingly. In such a manner, as the cellular phone 50 is in a charging mode, the re-positioning reminder device will not get alarmed.

Figure 10:
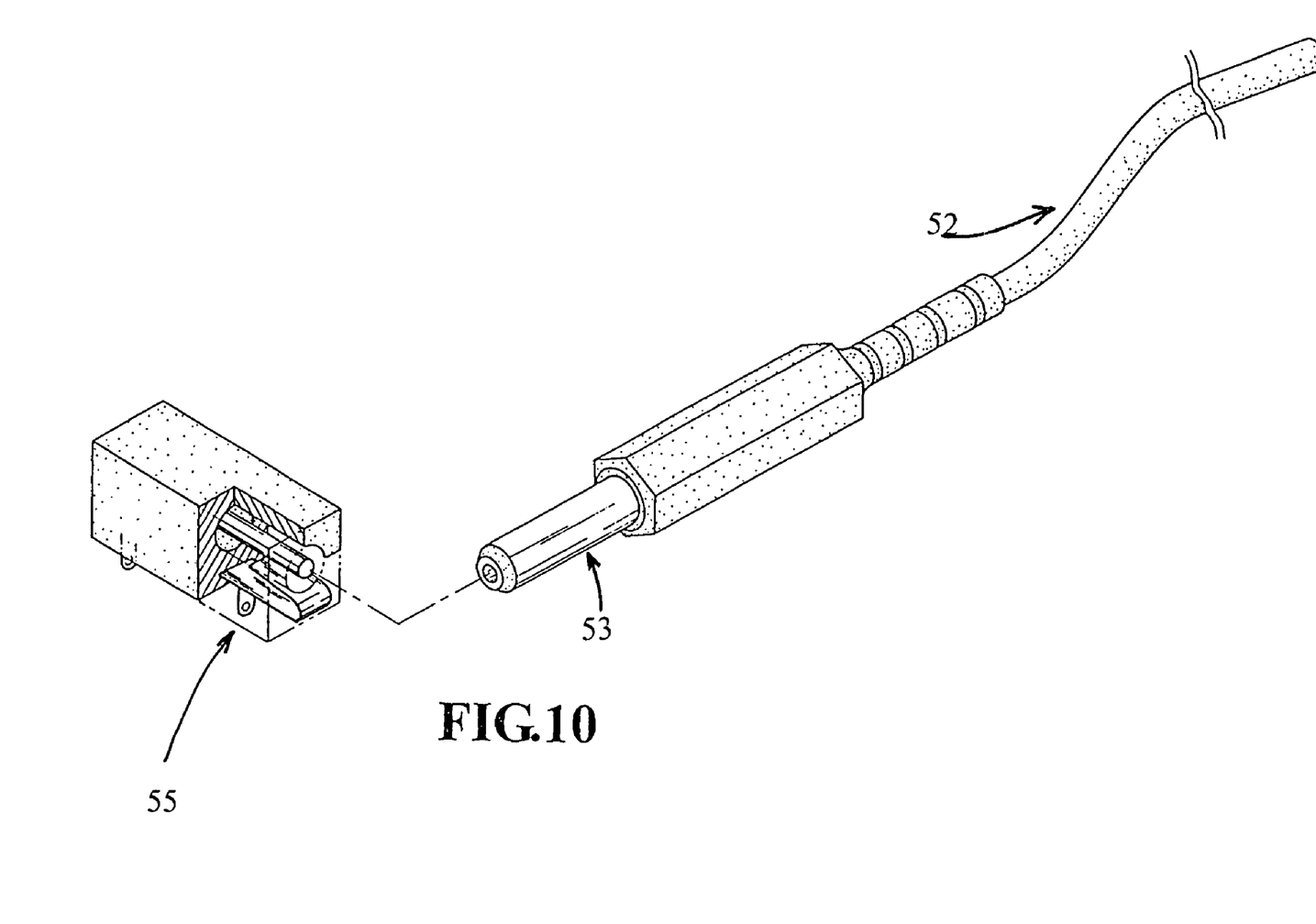
FIG. 10 is a diagram showing the second embodiment of the present invention wherein another travel charging means having a cylindrical plug is used; as the plug is engaged with the socket of the cellular phone, electrical power will be delivered to the socket, and at the same time, one set of mechanical contact points will be divided apart, the cellular phone will detect the input of electrical power or the breaking apart signal of the mechanical points can be detected so as to prevent the cellular phone from producing alarm sound.

As illustrated in FIG. 10, if the plug 53 of the traveler's cable type charger 52 is in a cylindrical shape, the mechanical break-off of a contact point in the socket 55 can be regarded as a signal or the power input of the external power supply can be adopted as a signal. In other words, as the cylindrical plug 53 of the cable type charger 52 is registered with the socket 55 of the cellular phone 50, a set of mechanical contact points will be parted off and the break-off will be treated as a signal so as to cause the alarm system of the cellular phone 50 to stop functioning.

In other way, as the power of the external power supply is inputting into the socket 55, the power input will serve as a signal to stop the re-positioning reminder program of the cellular phone 50 from time counting, resulting in the alarm system of the cellular phone 50 being shut off, as shown in FIG. 10 and the section F of FIG. 12.

However, by way of the re-positioning reminder of the present invention, a cellular phone can only be placed at the preset positions. If not, in excess of a preset period of time, the cellular phone 50 will produce alarm sound to remind the person not to leave his or her cellular phone behind without notice.

Moreover, the cellular phone can be housed in any kind of receiving means including a pocket of women's handbags or pockets of any clothes or garment in which a magnet or an infrared reflection means is mounted to turn off or turn on said time counting delay program of said cellular phone and said alarm means.

I claim:

1. A re-positioning for a cellular phone comprising:
   a PC board having a re-positioning reminder circuit defined thereon;
   wherein said re-positioning reminder circuit includes:
   an ON switch and an OFF switch;
   a time counting program being able to be turned on and off by said ON switch and OFF switch, wherein said time counting program is directly written or recorded inside a CPU of said cellular phone and electrical power is provided by a battery of said cellular phone; and
   an alarm device which can be actuated by said time counting program to selectively produce an alarm sound or not, and is a vibration ring circuit of said cellular phone;
   whereby as said cellular phone is taken away from a fixed position or taken out of a cellular phone pocket, said ON switch and OFF switch will actuate said time counting program of said re-positioning reminder circuit to effect time counting and if said cellular phone is not dialed or operated and still in a stand-by mode and is not put back to said fixed position or said cellular phone pocket within a pre-set period of time, said time counting program will actuate said alarm device to send out said alarm sound on said pre-set time running out to remind a user to put said cellular phone not in operation back to said fixed position or said cellular phone pocket; as long as said cellular phone is placed back to said fixed position or said cellular phone pocket; said ON/OFF switch will immediately stop said alarm device in operation; at then said re-positioning reminder circuit resumes said stand-by mode waiting for a next operation in which an identical procedure repeats when said cellular phone is taken away from said fixed position or said cellular phone pocket.

2. The re-positioning reminder for a cellular phone as claimed in claim 1 wherein when said cellular phone is taken away from said fixed position or said cellular phone pocket, said time counting program begins to count time and if said cellular phone is in operation, said time counting program stops a time counting operation till the end of the operation of said cellular phone terminates; said time counting program restarts said time counting operation and said cellular phone must be put back to said fixed position or in said cellular phone pocket within said pre-set time otherwise said alarm device will send out said alarm sound on the expiration of said pre-set time.

3. The re-positioning reminder for a cellular phone as claimed in claim 1 wherein said ON switch and OFF switch has such a capability to detect an approach or a departure with respect to an article preset on a particular position that said time counting program can be actuated by said ON switch and OFF switch.

4. The re-positioning reminder for a cellular phone as claimed in claim 3 wherein said ON switch and OFF switch is made up of a magnet plate and a magnet-operated reed-in-tube switch whereby said magnet plate fixed at a particular position can produce an ON/OFF signal when said reed-in-tube switch is made to come close or move away from said magnet plate so as to actuate said time counting program.

5. The re-positioning reminder for a cellular phone as claimed in claim 3 wherein said ON switch and OFF switch is of a reflection type infrared switch and a reflection means is fixed to a particular position or inside said cellular phone pocket so that an infrared beam from said infrared switch can be reflected back and received by a receiver in said infrared switch which can be said cellular phone equipped with an infrared transmitter whereby said receiver will receive an ON/OFF signal that will turn on or off said time counting program accordingly.

6. The re-positioning reminder for a cellular phone as claimed in claim 2 wherein a CPU contains said time counting program which can control a circuit that is a part of a vibration alarm of a cellular phone to produce said alarm sound.

7. The re-positioning reminder for a cellular phone as claimed in claim 1 wherein said time counting program is adjusted in accordance to a personal requirement.

8. A re-positioning reminder for a cellular phone as claimed in claim 1 further comprising a charger mount of said cellular phone equipped with a magnet plate or a reflection means at a proper position so that when said cellular phone is put back to said charger mount, said time counting program built in said cellular phone is stopped to function so as not to produce said alarm sound accordingly.

9. A re-positioning reminder for a cellular phone as claimed in claim 1 wherein said cellular phone is charged by a travel charging means having a socket-pin type plug in which a pair of pins are short circuited and as the plug is engaged in a charging socket of said cellular phone, the corresponding connection points of said charging socket will also be short circuited so as to stop said cellular phone producing said alarm sound to remind a user.

10. A re-positioning reminder for a cellular phone as claimed in claim 1 wherein said cellular phone is charged by a travel charging means having a cylindrical plug; as the plug is engaged with a charging socket of said cellular phone, electrical power will be delivered to said socket, and at the same time, one set of mechanical contact points in said cylindrical plug will be divided apart, said cellular phone will detect an input of electrical power or a breaking apart signal of said mechanical points can be detected so as to prevent said cellular phone from producing said alarm sound.

11. The re-positioning reminder for a cellular phone as claimed in claim 1 wherein as said cellular phone is placed in said charger mount, a charging power signal enters said cellular phone serving as a signal to stop said cellular phone to produce said alarm sound.

12. The re-positioning reminder for a cellular phone as claimed in claim 1 wherein said PC board is equipped with said re-positioning reminder circuit having a magnet operated reed-in-tube switch is housed in an independent shelter provided with a battery which supplies electrical power to said PC board and a buzzer for generating said alarm sound.

13. The re-positioning reminder for a cellular phone as claimed in claim 3 wherein said cellular phone can be housed in any kind of receiving means including a pocket of a women's handbag or a pocket of any clothes or garment in which a magnet or an infrared reflection means is mounted to turn off or turn on said time counting program of said cellular phone and said alarm device.

14. The re-positioning reminder for a cellular phone as claimed in claim 4 wherein said cellular phone can be housed in any kind of receiving means including a pocket of a women's handbag or a pocket of any clothes or garment in which a magnet or an infrared reflection means is mounted to turn off or turn on said time counting program of said cellular phone and said alarm device.

15. The re-positioning reminder for a cellular phone as claimed in claim 5 wherein said cellular phone can be housed in any kind of receiving means including a pocket of a women's handbag or a pocket of any clothes or garment in which a magnet or an infrared reflection means is mounted to turn off or turn on said time counting program of said cellular phone and said alarm device.

16. A re-positioning for a cellular phone comprising:
a PC board having a re-positioning reminder circuit defined thereon;
wherein said re-positioning reminder circuit includes:
an ON switch and an OFF switch;
a time counting program being able to be turned on and off by said ON switch and OFF switch; and
an alarm device which can be actuated by said time counting program to selectively produce an alarm sound or not;
whereby as said cellular phone is taken away from a fixed position or taken out of a cellular phone pocket:
said ON switch and OFF switch will actuate said time counting program of said re-positioning reminder circuit to effect time counting and if said cellular phone is not dialed or operated and still in a stand-by mode and is not put back to said fixed position or said cellular phone pocket within a pre-set period of time, said time counting program will actuate said alarm device to send out said alarm sound on said pre-set time running out to remind a user to put said cellular phone not in operation back to said fixed position or said cellular phone pocket; as long as said cellular phone is placed back to said fixed position or said cellular phone pocket; said ON/OFF switch will immediately stop said alarm device in operation; at then said re-positioning reminder circuit resumes said stand-by mode waiting for a next operation in which an identical procedure repeats when said cellular phone is taken away from said fixed position or said cellular phone pocket;
said time counting program begins to count time and if said cellular phone is in operation, said time counting program stops a time counting operation till an end of operation of said cellular phone terminates; said time counting program restarts said time counting operation and said cellular phone must be put back to said fixed position or in said cellular phone pocket within said pre-set time otherwise said alarm device will send out said alarm sound on expiration of said pre-set time; and
a CPU contains said time counting program which can control a circuit that is a part of a vibration alarm of said alarm device of said cellular phone to produce said alarm sound.

17. A re-positioning for a cellular phone comprising:
a PC board having a re-positioning reminder circuit defined thereon;
wherein said re-positioning reminder circuit includes:
an ON switch and an OFF switch;
a time counting program being able to be turned on and off by said ON switch and OFF switch and adjusted in accordance to a personal requirement; and
an alarm device which can be actuated by said time counting program to selectively produce an alarm sound or not;
whereby as said cellular phone is taken away from a fixed position or taken out of a cellular phone pocket, said ON switch and OFF switch will actuate said time counting program of said re-positioning reminder circuit to effect time counting and if said cellular phone is not dialed or operated and still in a stand-by mode and is not put back to said fixed position or said cellular phone pocket within a pre-set period of time, said time counting program will actuate said alarm device to send out said alarm sound on said pre-set time running out to remind a user to put said cellular phone not in operation back to said fixed position or said cellular phone pocket; as long as said cellular phone is placed back to said fixed position or said cellular phone pocket; said ON/OFF switch will immediately stop said alarm device in operation; at then said re-positioning reminder circuit resumes said stand-by mode waiting for a next operation in which an identical procedure repeats when said cellular phone is taken away from said fixed position or said cellular phone pocket.

18. The re-positioning reminder for a cellular phone as claimed in claim 17 wherein said ON switch and OFF switch is made up of a magnet plate and a magnet-operated reed-in-tube switch whereby said magnet plate fixed at a particular position can produce an ON/OFF signal when said reed-in-tube switch is made to come close or move away from said magnet plate so as to actuate said time counting program.

19. The re-positioning reminder for a cellular phone as claimed in claim 17 wherein said ON switch and OFF switch is of a reflection type infrared switch and a reflection means is fixed to a particular position or inside said cellular phone pocket so that an infrared beam from said infrared switch can be reflected back and received by a receiver in said infrared switch which can be said cellular phone equipped with an infrared transmitter whereby said receiver will receive an ON/OFF signal that will turn on or off said time counting program accordingly.

20. A re-positioning reminder for a cellular phone as claimed in claim 17 further comprising a charger mount of said cellular phone equipped with a magnet plate or a reflection means at a proper position so that when said cellular phone is put back to said charger mount, said time counting program built in said cellular phone is stopped to function so as not to produce said alarm sound accordingly.

* * * * *